(12) United States Patent
MacDonald

(10) Patent No.: US 7,782,600 B2
(45) Date of Patent: Aug. 24, 2010

(54) ACCESS SELF-SERVICE TERMINAL

(75) Inventor: Alexander S. MacDonald, Dundee (GB)

(73) Assignee: NCR Corporation, Duluth, GA (US)

( * ) Notice: Subject to any disclaimer, the term of this patent is extended or adjusted under 35 U.S.C. 154(b) by 183 days.

(21) Appl. No.: 12/012,163

(22) Filed: Jan. 31, 2008

(65) Prior Publication Data

US 2009/0195994 A1 Aug. 6, 2009

(51) Int. Cl.
*G06F 1/16* (2006.01)
(52) U.S. Cl. .................. 361/679.21; 235/379; 715/810; 455/556.2
(58) Field of Classification Search .................. 235/379; 715/810; 718/102; 455/575.1, 556.2; 361/679.01, 361/679.27, 679.31
See application file for complete search history.

(56) References Cited

U.S. PATENT DOCUMENTS

| 2002/0074393 A1* | 6/2002 | Anderson et al. | 235/379 |
| 2007/0262134 A1* | 11/2007 | Humphrey et al. | 235/379 |
| 2008/0141169 A1* | 6/2008 | Sakura et al. | 715/810 |

* cited by examiner

*Primary Examiner*—Hung V Duong
(74) *Attorney, Agent, or Firm*—Michael Chan, Esq.

(57) ABSTRACT

A self service terminal having a casing with a selectively releasable display. The display is secured to the casing using a fastener (75) that can only be unfastened from inside the casing.

13 Claims, 5 Drawing Sheets

ACCESS SELF-SERVICE TERMINAL

The present invention relates to a self-service terminal, for example, an automated teller machine, having improved access.

BACKGROUND

In automated teller machines, and in particular cash dispensing machines, security issues are paramount. Such machines typically have a front facing fascia that is accessible by users. For servicing, repair and general maintenance, access to the interior of the machine important, but without compromising security. This can be difficult, particularly if the components are located close to the front fascia.

Attempts have been made to improve access to fascia components by providing access to automated teller machines from the front fascia by using hinged or racked fascia components or panels. The removable panels are unlocked or unclasped from the front and slid forward on racks or lowered down on hinges.

SUMMARY OF INVENTION

According to a first aspect of this invention there is provided a self service terminal having a casing with an external section that is selectively releasable from inside the casing.

Since the rear of the terminal is generally located within a bank, a room in a shop or in a bespoke installation where extra security can be provided, having a movable external section, such as a front display, that is releasable only from inside the casing, and not the front, improves security. It also provides better access to the components located at the front and in particular, in the vicinity of the front display. At least one fastener may be provided for fastening the releasable section in place, wherein the fastener is operable from inside the casing to unfasten the section.

A first face of the external section may face outwardly and a second face may face inwardly, wherein the at least one fastener or a part thereof is located on the second face.

The fastener may be operable to fasten and unfasten the releasable section. The fastener may be biased towards a fastening position.

The fastener may be operable automatically to fasten the external section in place when it is returned to the casing from a released position.

The at least one fastener may be a latch, for example a mechanical latch or an electromagnetic latch.

The front section may include a bezel. The front section may include a display. The bezel may surround the display. The fasteners may be attached to the bezel.

By having a removable screen/bezel section, a reasonably sized, useable aperture in the casing is exposed that allows greater access without compromising security. Thus, service time is reduced due to easier access to components and there is no need to remove cabinet modules to gain access to the components located in the vicinity of the fascia area. The screen/bezel may also be quickly and easily replaced when needed.

According to another aspect of the invention, there is provided a method of accessing a self service terminal according to the first aspect of the invention, the method involving accessing the casing from the rear and operating the at least one fastener from inside the casing to release the external section. This allows access to the inside of the casing from the front, whilst hiding or concealing the fastener in the interior of the casing, thereby improving security.

BRIEF DESCRIPTION OF DRAWINGS

Various aspects of the invention will now be described by way of example only and with reference to the accompanying drawings of which.

DETAILED DESCRIPTION OF DRAWINGS

Figure 1:
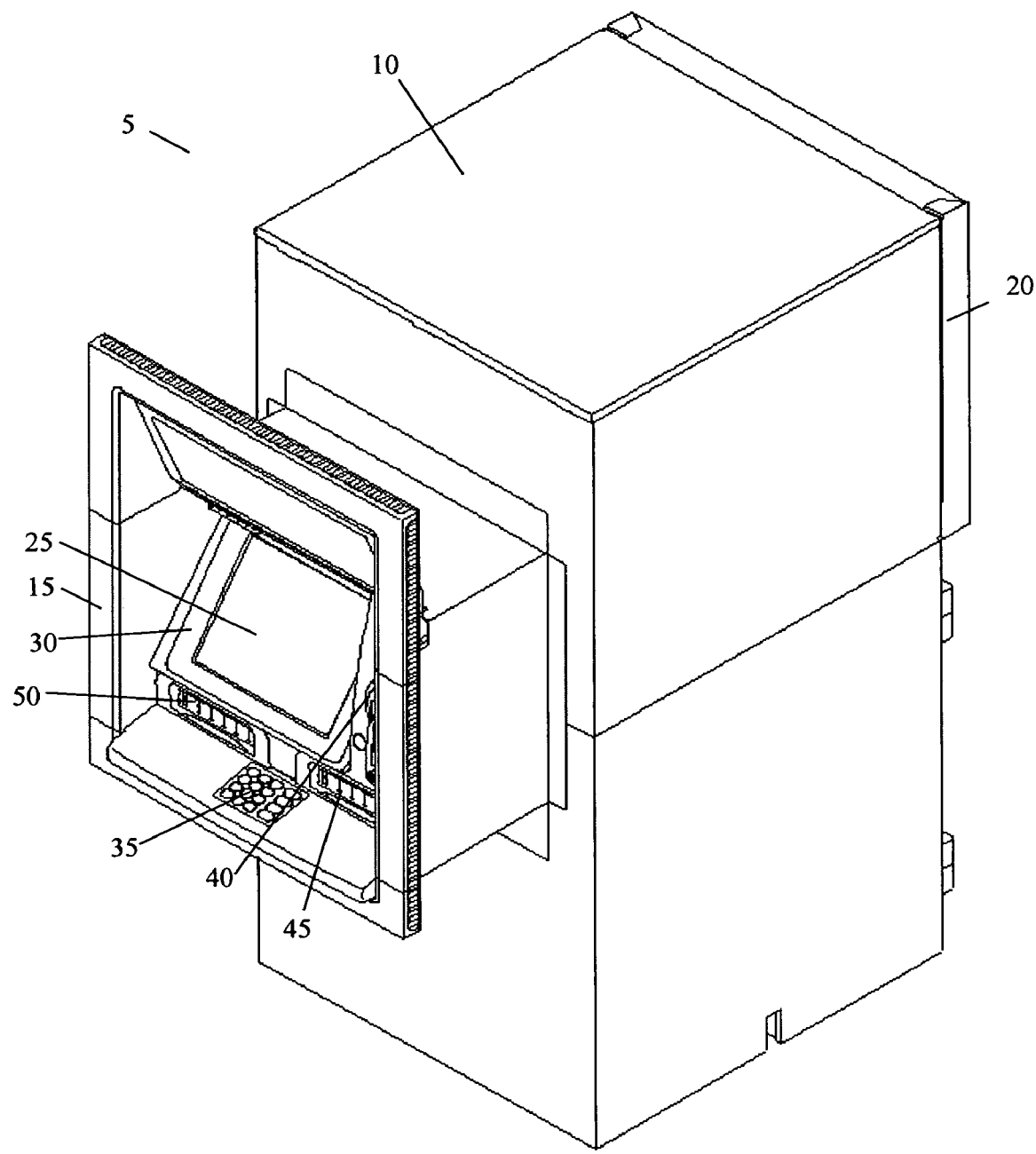
FIG. 1 is a diagram of a self service terminal having the housing cut away in cross section.

FIG. 1 shows a self service terminal 5 having a casing 10 enclosing internal components of the terminal 5. The casing 10 has a front fascia 15 that, in use, is located so as to be accessible users. The terminal 5 also has a secure rear access hatch 20 that can be locked and opened using at least one lock. In use, this would typically be located in a relatively secure environment, such as within a bank or in a locked room within a shop or within a bespoke secure housing. A screen 25 that has a bezel 30 is located on the front fascia 15. Other devices known in the art such as at least one keypad 35, a card input slot 40 and associated card reader, a shuttered cash dispensing slot 45 and associated cash dispensing system, and other input/output slots 50 and associated means (e.g. a pay-in envelope receiver) may be located on, or accessible via, the front fascia 15.

Figure 2:
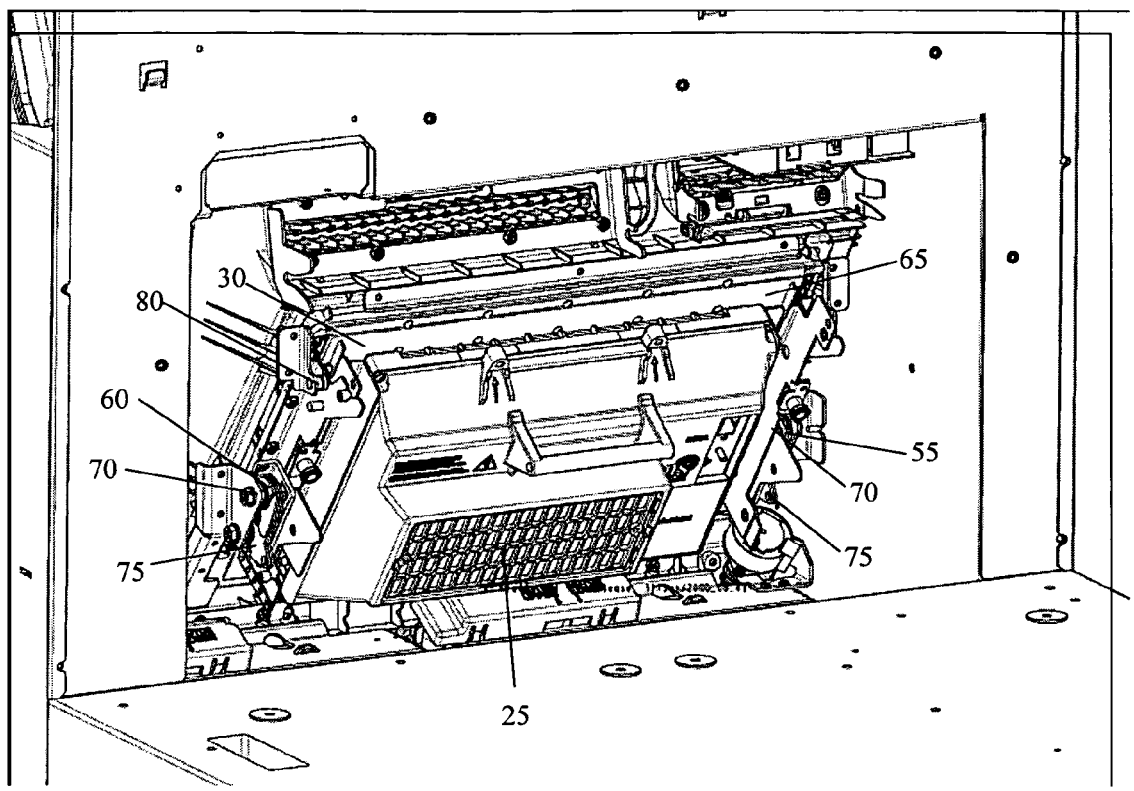
FIG. 2 is an internal view of the terminal of FIG. 1.

As shown in FIG. 2, the screen/bezel arrangement 25/30 is secured in place by two releasable latches 55, 60 mounted to the casing 20. The latches 55, 60 receive locking members 70 mounted on a rear face 65 of the bezel 30. The latches 55, 60 are located inside the casing 10 of the terminal 5. Latching members 75 are operable to unlock or lock the latches 55, 60. They are biased to securely engage the locking members 70 when the bezel 30 is suitably positioned. In the example shown, the latching members 75 are biased using a spring, but for other latching mechanisms, the latching members 75 could be biased for example by gravity or using other springs or resilient members.

Figure 3:
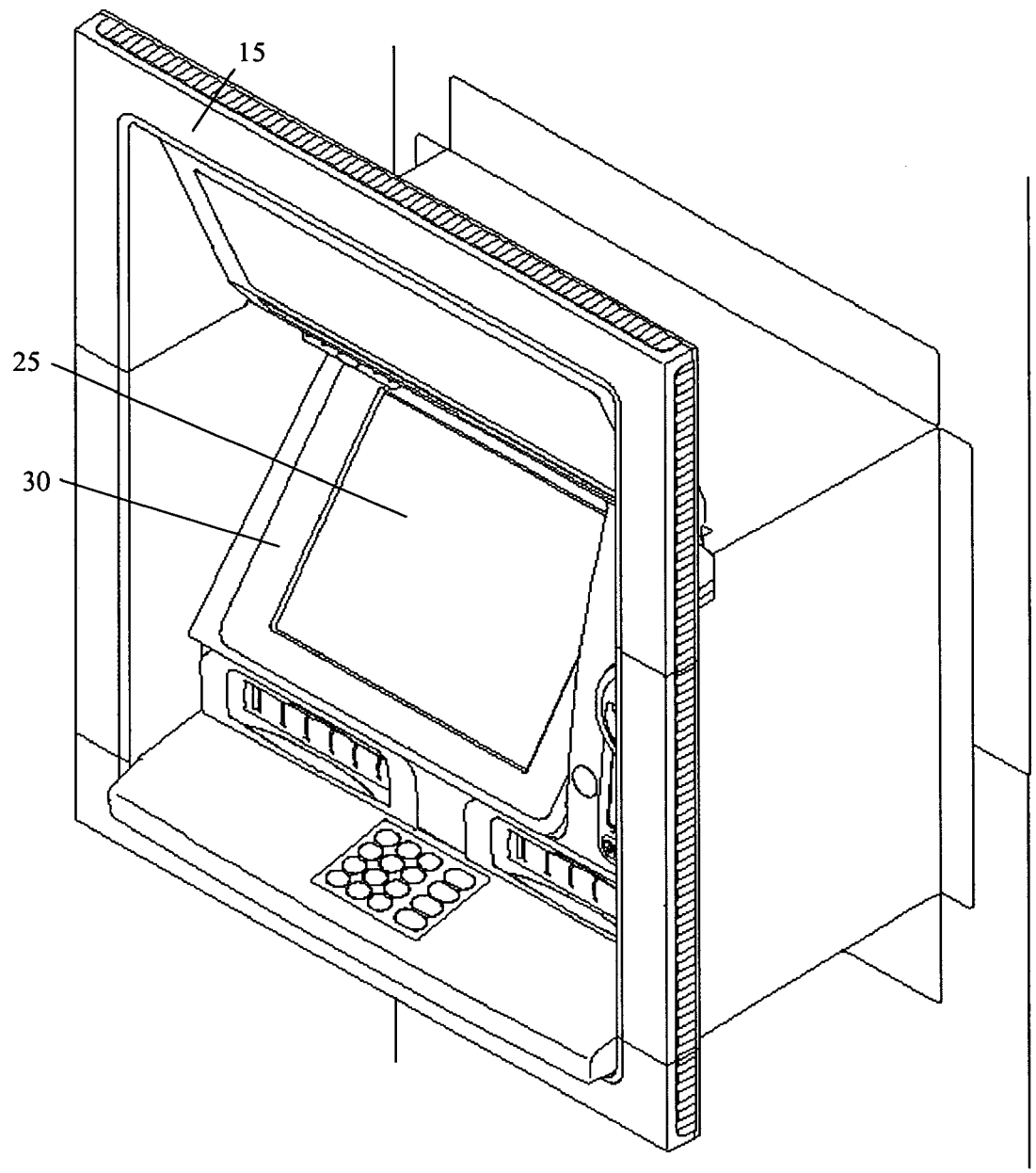
FIG. 3 is an external view of the terminal of FIG. 1.
Figure 4:
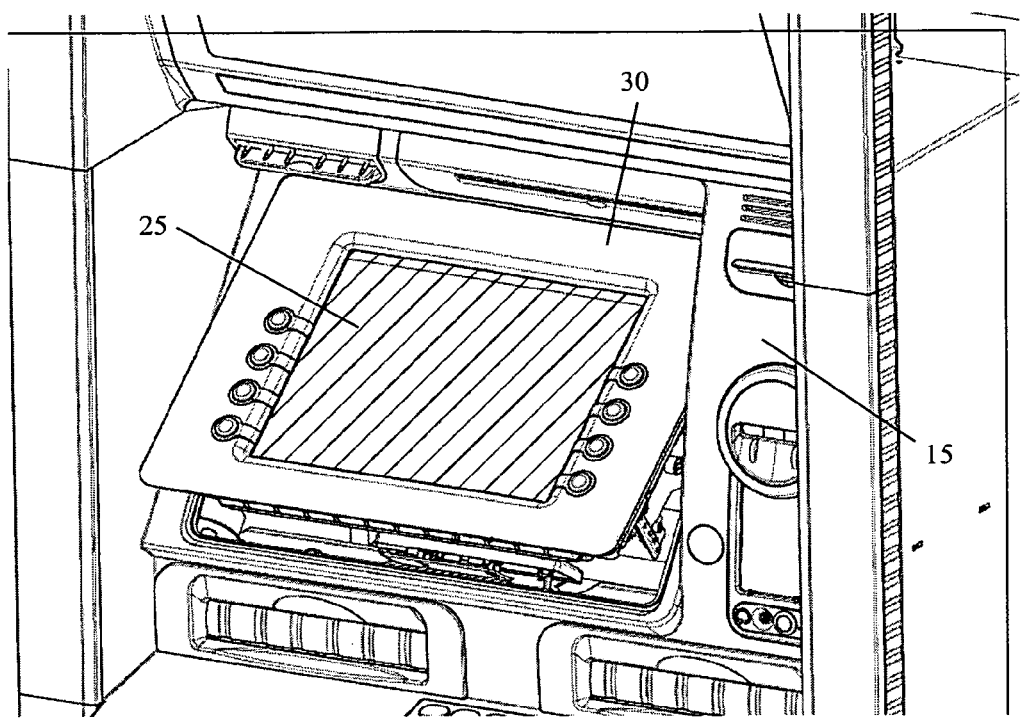
FIG. 4 is an external view of the terminal of FIG. 1, wherein the screen and bezel have been released.
Figure 5:
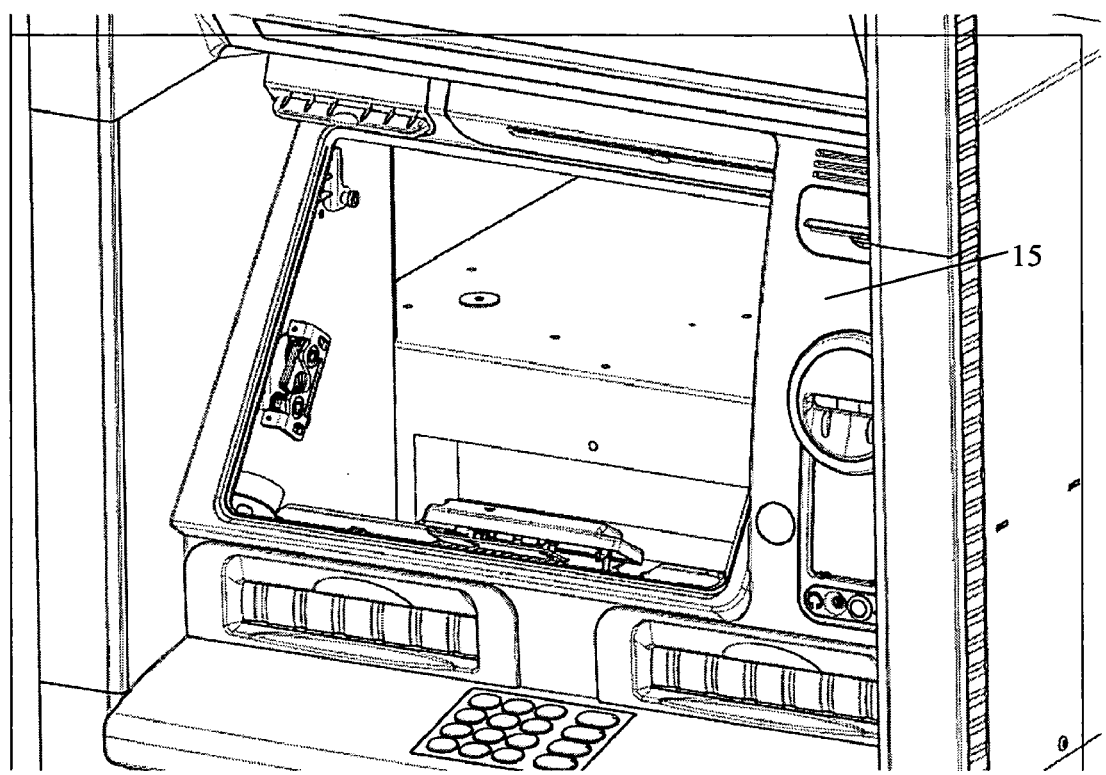
FIG. 5 is an external view of the terminal wherein the screen and bezel have been fully removed.

When an engineer seeks access to components located towards the front of the casing 10, for example for repair or servicing, the engineer first unlocks the rear hatch 20 and accesses the terminal 5 from the rear, in conventional fashion. He then unlocks the latches 55, 60 of the bezel 30 from within the casing 10. A retainer 80, such as a connecting cable or rod, is provided on the rear of the bezel 30 to prevent the screen/bezel 25/30 from dropping or falling from the fascia 15 once unlatched. The retainer 80 can be unhooked from the front of the terminal 5 once the bezel 30 has been pulled forward. The engineer may then access the inside of the casing 10 from the front of the terminal 5 by removing the bezel 30 and screen 25, as shown in FIGS. 3 to 5. The bezel 30 and screen 25 may be a standard size for quick and easy replacement with a similarly standard sized replacement or upgrade component. Once the engineer has completed the repair, servicing or replacement, the screen/bezel arrangement 25/30 is moved back into position and the biased latching members 75 move automatically to engage the locking members 70 and lock the screen/bezel arrangement 25/30 in place.

Modifications may be made to the embodiment described above without departing from the scope of the invention. For example, whilst the screen 25 and bezel 30 are described as being preferentially removable, a skilled person will realize that other components, such as the keypad 35 and/or dispensing 45 an/or receiving slots 40, 50 and associated systems, may be alternately or additionally removable as described above. Although a mechanical latch has been described, it will be appreciated that other types of fastener or securing means could be used. In addition, whilst a particular form of latch 55, 60 and locking members 75 is described, other suitable latching and/or locking means may be used, for example, electromagnetic locks or keyed barrel locks. Furthermore, whilst the screen/bezel arrangement 25/30 is described as being removable, a skilled person would appreciate that it may also merely be movable by other means, e.g. hinged or racked.

What is claimed is:

1. A self service terminal comprising:
a casing for enclosing internal components of the terminal;
a fascia disposed on the casing and accessible to a user to allow the user to conduct a self-service transaction at the terminal;
a releasable display unit mounted within an aperture defined by the fascia; and
a fastener accessible from inside the casing and for (i) when fastened, securing the display unit in place relative to the fascia, and (ii) when unfastened, releasing the display unit to allow the display unit to be moved away from the fascia and thereby to allow access to internal components of the terminal through the aperture defined by the fascia, without having to move the fascia away from the casing.

2. A self service terminal according to claim 1, wherein the display unit includes a screen and a releasable bezel which surrounds at least a portion of the screen.

3. A self service terminal according to claim 2, wherein (i) a first face of the bezel faces outwardly, (ii) a second face of the bezel faces inwardly, and (iii) at least a portion of the fastener is disposed on the second face of the bezel.

4. A self service terminal according to claim 3, wherein the fastener includes a latching member which, when latched, secures the screen and the bezel in place relative to the fascia.

5. A self service terminal according to claim 4, wherein the fastener includes a biasing member which biases the latching member to a fastened position which secures the screen and the bezel in place relative to the fascia.

6. A self service terminal according to claim 1, wherein the fastener is operable automatically to fasten the display unit in place relative to the fascia after the display unit has been moved away from the fascia and then remounted within the aperture defined by the fascia.

7. A self service terminal comprising:
a casing for enclosing internal components of the terminal;
a fascia disposed on the casing and accessible to a user to allow the user to conduct a self-service transaction at the terminal;
a display screen mounted within an aperture defined by the fascia;
a bezel surrounding at least a portion of the display screen; and
a fastener accessible from only inside the casing and for (i) when fastened, securing the display screen and the bezel in place relative to the fascia, and (ii) when unfastened, releasing at least one of the display screen and the bezel to allow the display screen to be moved away from the fascia.

8. A self service terminal according to claim 7, wherein (i) a first face of the bezel faces outwardly, (ii) a second face of the bezel faces inwardly, and (iii) at least a portion of the fastener is disposed on the second face of the bezel.

9. A self service terminal according to claim 7, wherein the fastener includes a latching member which, when latched, secures the display screen and the bezel in place relative to the fascia.

10. A self service terminal according to claim 9, wherein the fastener includes a biasing member which biases the latching member to a fastened position which secures the display screen and the bezel in place relative to the fascia.

11. A self service terminal according to claim 7, wherein the fastener is operable automatically to fasten the display screen and the bezel in place relative to the fascia after the display screen has been moved away from the fascia and then remounted within the aperture defined by the fascia.

12. A method of a service person interacting with a self service terminal having a casing, a fascia, and a display unit which is mounted within an aperture defined by the fascia and which is movable away from the fascia, the method comprising:
accessing inside of the casing from a side which is other than front side of the casing; and
after gaining access to inside of the casing from the side which is other than front side of the casing, operating a fastener which is accessible from only inside the casing to release the display unit and thereby to allow the display unit to be moved away from the fascia and thereby to allow access to internal components of the terminal through the aperture defined by the fascia, without having to move the fascia away from the casing.

13. A method according to claim 12, wherein accessing comprises accessing inside of the casing from only a rear side of the casing.

* * * * *